United States Patent [19]

Nishikuri et al.

[11] 4,331,584
[45] May 25, 1982

[54] STYRYL COMPOUNDS AND COLORING SYNTHETIC RESINS THEREWITH

[75] Inventors: Masao Nishikuri, Hirakata; Michio Yamazaki; Kiyoteru Kojima, both of Toyonaka; Junzaburo Seino, Kishiwada; Hirohito Kenmochi, Takatsuki, all of Japan

[73] Assignee: Sumitomo Chemical Company, Limited, Osaka, Japan

[21] Appl. No.: 152,611

[22] Filed: May 23, 1980

[30] Foreign Application Priority Data

Jun. 4, 1979 [JP] Japan .................. 54-70368
Jun. 6, 1979 [JP] Japan .................. 54-71664
Jul. 2, 1979 [JP] Japan .................. 54-84334

[51] Int. Cl.³ .................. C09B 23/14; C07C 121/78
[52] U.S. Cl. .................. 524/206; 8/512; 8/519; 260/465 D; 260/465 E; 524/567; 524/577; 524/565
[58] Field of Search .............. 8/512, 519; 260/465 D, 260/465 E, 37 N, 37 P, 37 PC, 42.21

[56] References Cited

U.S. PATENT DOCUMENTS

| | | | |
|---|---|---|---|
| 3,386,491 | 6/1968 | Weaver et al. | 260/465 E X |
| 3,504,010 | 3/1970 | Straley et al. | 260/465 D |
| 3,597,434 | 8/1971 | Weaver | 260/465 D X |
| 3,917,604 | 11/1975 | Hoyle | 260/465 E X |
| 3,927,063 | 12/1975 | Peter et al. | 260/465 D |
| 4,088,673 | 5/1978 | Gomm et al. | 260/465 E |

FOREIGN PATENT DOCUMENTS

| | | |
|---|---|---|
| 688621 | 3/1967 | Belgium . |
| 1569678 | 4/1971 | Fed. Rep. of Germany . |
| 2412227 | 9/1974 | Fed. Rep. of Germany . |
| 48-2714 | 1/1973 | Japan . |
| 516628 | 1/1972 | Switzerland . |
| 843645 | 7/1960 | United Kingdom . |
| 1201925 | 9/1966 | United Kingdom . |

Primary Examiner—Dolph H. Torrence
Attorney, Agent, or Firm—Stevens, Davis, Miller & Mosher

[57] ABSTRACT

Styryl compounds represented by the following general formula (I):

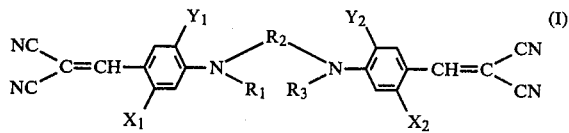

wherein $X_1$ is a halogen atom or a lower alkyl or lower alkoxy group, $X_2$, $Y_1$ and $Y_2$ are each a hydrogen or halogen atom or a lower alkyl or lower alkoxy group, $R_1$ and $R_3$ are each an unsubstituted or substituted alkyl group, and $R_2$ is a straight or branched $C_3$–$C_{10}$ alkylene group or an alicyclic hydrocarbon-containing alkylene group, a process for producing them, a process for dyeing and printing hydrophobic fibers by their use and a process for coloring synthetic resins by their use. According to said processes a clear yellow color of high fastness can be given to the fibers and synthetic resins.

7 Claims, No Drawings

STYRYL COMPOUNDS AND COLORING SYNTHETIC RESINS THEREWITH

This invention relates to styryl compounds, a process for producing them and a process using said compounds for dyeing or printing fibers and coloring synthetic resins. More particularly, it relates to styryl compounds represented by the following general formula (I):

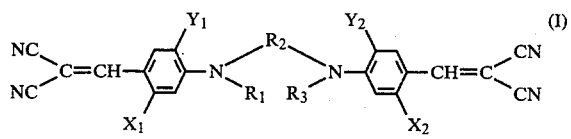

wherein $X_1$ is a halogen atom or a lower alkyl or lower alkoxy group, $X_2$, $Y_1$ and $Y_2$ are each a hydrogen or halogen atom or a lower alkyl or lower alkoxy group, $R_1$ and $R_3$ are each an unsubstituted or substituted alkyl group, and $R_2$ is a straight or branched $C_3$–$C_{10}$ alkylene group or an alicyclic hydrocarbon-containing alkylene group, as well as to a process for producing them and a process for dyeing or printing hydrophobic fibers and coloring synthetic resins characterized by using said styryl compounds.

Though styryl dyes are clear greenish yellow dyes generally excellent in light fastness, they have faults that they are poor in fastness to sublimation and inferior in pH insensitivity, namely the resistance to decomposition due to pH change at the time of dyeing. Among these faults, the fastness to sublimation has been improved to some extent by introducing a polar group or by increasing the size of dye molecule. As to pH insensitivity, however, no improvement has ever been realized and no excellent reproducibility can be obtained in the actual dyeing, so that styryl dyes are not yet used extensively though their molar absorptivity is as high as that of quinophthalone dyes and their color is clear.

The present inventors conducted earnest studies on styryl type disperse dyes excellent in pH insensitivity to find out that the styryl dyes represented by the above-mentioned general formula (I) can overcome the faults mentioned above and they are yellow colored disperse dyes excellent in resistance to sublimation resistance to light and fastness to water and others.

However, it was found that the dye represented by general formula (I) is insufficient in build-up property if it is used alone. As the result of more detailed studies on this point, it was found that an excellent build-up property can be exhibited by using two or more kinds of the dyes and preferably three or more kinds of the dyes which are represented by the general formula (I) and, at the same time, different in structure from each other.

It should be noted here that, if two kinds of the above-mentioned dye are used in combination, the color strength attainable is approximately twice that attainable with a single dye. Similarly, if three or four kinds of the dye are used in combination, the color strength attainable is approximately 3 or 4 times that attainable with a single dye, respectively. This is an entirely unexpected result, and its practical merit is very great.

Further, the inventors found that a yellow color of high fastness can be obtained when the styryl compounds of general formula (I) are used for the coloration of synthetic resins. Based on these findings, this invention was accomplished.

In the formula (I), the lower alkyl and lower alkoxy groups for $X_1$, $X_2$, $Y_1$ and $Y_2$ mean a $C_1$–$C_4$ alkyl (preferably methyl or ethyl) and $C_1$–$C_4$ alkoxy (preferably methoxy or ethoxy) groups, respectively, and a preferable halogen is chlorine or bromine. The alkyl group for $R_1$ and $R_3$ means a $C_1$–$C_4$ alkyl group which may be substituted with a $C_1$–$C_4$ alkoxy (preferably methoxy or ethoxy), cyano, acyl (preferably acetyl) or phenyl group, or a halogen atom (preferably chlorine or bromine). In the alkylene group for $R_2$, a $C_5$–$C_7$ alkylene group is preferable, and —$C_5H_{10}$— or —$C_6H_{12}$— is more preferable. The embodiments of the dye of the formula (I) are as shown in Table 1.

TABLE 1

| No. | $X_1$ | $Y_1$ | $R_1$ | $R_2$ | $R_3$ | $X_2$ | $Y_2$ |
|---|---|---|---|---|---|---|---|
| (1) | $CH_3$ | H | $C_2H_5$ | $C_6H_{12}$ | $C_2H_5$ | $CH_3$ | H |
| (2) | $CH_3$ | H | $C_2H_5$ | $C_5H_{10}$ | $C_2H_5$ | $CH_3$ | H |
| (3) | $CH_3$ | H | $CH_3$ | $C_6H_{12}$ | $CH_3$ | $CH_3$ | H |
| (4) | $CH_3$ | H | $C_2H_4OCH_3$ | $C_6H_{12}$ | $C_2H_4OCH_3$ | $CH_3$ | H |
| (5) | $OCH_3$ | H | $C_2H_5$ | $C_5H_{10}$ | $C_2H_5$ | $OCH_3$ | H |
| (6) | $OCH_3$ | $OCH_3$ | $CH_3$ | $C_5H_{10}$ | $CH_3$ | $OCH_3$ | $OCH_3$ |
| (7) | Cl | H | $CH_3$ | $C_6H_{12}$ | $CH_3$ | Cl | H |
| (8) | $CH_3$ | H | $CH_3$ | $C_6H_{12}$ | $C_2H_5$ | $CH_3$ | H |
| (9) | $CH_3$ | H | $C_2H_4CN$ | $C_5H_{10}$ | $C_2H_4CN$ | $CH_3$ | H |
| (10) | $OCH_3$ | H | $C_2H_5$ | $C_8H_{16}$ | $C_2H_5$ | $OCH_3$ | H |
| (11) | $CH_3$ | H | $C_2H_4OCOCH_3$ | $C_5H_{10}$ | $C_2H_4OCOCH_3$ | $CH_3$ | H |
| (12) | $OCH_3$ | H | $C_2H_4Cl$ | $C_5H_{10}$ | $C_2H_4Cl$ | $OCH_3$ | H |
| (13) | $CH_3$ | H | $C_2H_5$ | $C_7H_{14}$ | $C_2H_5$ | $CH_3$ | H |
| (14) | $OCH_3$ | H | $C_2H_5$ | $C_4H_8$ | $C_2H_5$ | $OCH_3$ | H |
| (15) | $OCH_3$ | $OCH_3$ | $CH_3$ | $C_8H_{16}$ | $CH_3$ | $OCH_3$ | $OCH_3$ |
| (16) | Cl | H | $CH_3$ | $C_5H_{10}$ | $CH_3$ | Cl | H |
| (17) | $CH_3$ | H | $CH_3$ | $C_6H_{12}$ | $C_2H_5$ | H | H |
| (18) | $CH_3$ | H | $C_2H_4OCH_3$ | $C_5H_{10}$ | $C_2H_4OCH_3$ | $CH_3$ | H |

With the dye of this invention, hydrophobic fibers belonging to synthetic and semi-synthetic fibers such as cellulose acetate fiber and particularly polyester fiber can be dyed or printed into a clear yellow color with excellent dyeing affinity, pH insensitivity (resistance to decomposition), resistance to sublimation and resistance to light and with a high reproducibility. As compared with the disclosed styryl dyes, the dye of this invention exhibits an excellent dyeing affinity particularly to fine denier polyester fibers and artificial leathers dyeing of which assumes an increasing importance today.

Further, the dye of this invention has an excellent pH insensitivity and, at the same time, readily decomposes when pH value exceeds 7 and reaches 9 or more. Therefore, the stain of cotton in the dyeing of T/C mixed yarn fabric can easily be removed by washing with alkali, which is another advantage of the dye. In the printing process, a resist printing with alkali is also possible.

Hereunder, the characteristic feature of the dye of this invention will be detailed in connection with prior techniques. As disclosed styryl dyes, those mentioned in Japanese Patent Publication No. 11,432/1961, Japanese Patent Publication No. 2,799/1966 and Japanese Patent Publication No. 2,714/1973 can be referred to. The dye of this invention is generally superior to these dyes, in properties such as dyeing affinity, pH insensitivity (resistance to decomposition), resistance to sublimation, resistance to light, fastness to water, etc. Some of the results of comparative test are mentioned below.

The dye of Japanese Patent Publication No. 11,432/1961

(Comparative Example 1)

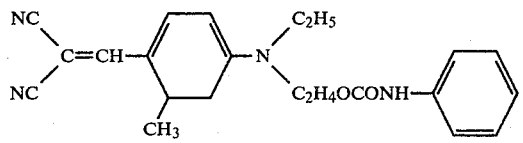

The dye of Japanese Patent Publication No. 2,799/1966

(Comparative Example 2)

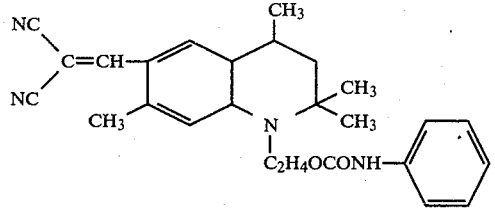

The dye of Japanese Patent Publication No. 2,714/1973

(Comparative Example 3)

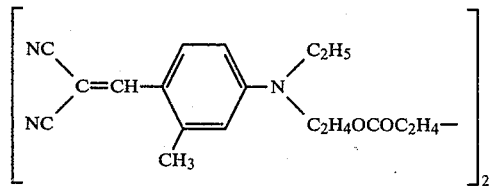

TABLE 2

| | Sample No. (in Table 1) | pH-insensitivity (decomposition rate) |
|---|---|---|
| Dyes of this invention | Dye of formula (1) | 10% |
| | Dye of formula (2) | 15% |
| | Dye of formula (3) | 10% |
| Comparative dyes | Dye of Comparative Example 1 | 95% |
| | Dye of Comparative Example 2 | 80% |
| | Dye of Comparative Example 3 | 90% |

(Note) pH-insensitivity (decomposition rate)

$$\text{Decomposition rate (\%)} = 1 - \frac{\text{K/S value (Kuberka-Munk) at pH 7}}{\text{K/S value (Kuberka-Munk) at pH 5}} \times 100$$

Dyeing conditions: 130° C. × 60 minutes
0.5% o.w.f.
Bath ratio 1:30

Fiber: polyester textured fabric

TABLE 2-continued

| | Sample No. (in Table 1) | pH-insensitivity (decomposition rate) |
|---|---|---|
| Composition of dye: (per 10 parts) | Concentrated dye cake | 2 parts |
| | Naphthalenesulfonic acid type dispersant | 5 parts |
| | Ligninsulfonic acid type dispersant | 3 parts |

It is apparent from Table 2 that the dyes 1, 2 and 3 of this invention are remarkably superior to the dyes of Comparative Examples 1, 2 and 3 in pH insensitivity (resistance to decomposition) poorness of which is considered the most important fault of styryl type dyes, and are improved in this point to such an extent as to incur scarce problems practically so long as pH does not exceed 7.

In order to further evidence the effect of this invention, an exhaustive dyeing (130° C., 1 hour, bath ratio 1:30; the treating bath contained 2 g/liter of anionic surfactant) of polyester fiber was carried out with the dyes of formulas (1), (2) and (3) in Table 1. Table 3 lists the percentages of exhaustion of dye found in the cases that each of dyes (1), (2) and (3) were used alone, that dye (1) and dye (2) were mixed together in a proportion of 1:1 and that dyes (1), (2) and (3) were mixed together in a proportion of 1:1:1. It is apparent from Table 3 that the use of the dyes in the form of a mixture has a remarkable effect on the improvement of build-up property.

TABLE 3

| | Percentage of exhaustion of dye (%) | | | |
|---|---|---|---|---|
| Dye used | 0.5%* | 1% | 2% | 3% |
| (1) | 98 | 87 | 47 | 29 |
| (2) | 100 | 95 | 52 | 35 |
| (3) | 98 | 89 | 51 | 32 |
| (1) + (2) | 100 | 99 | 96 | 64 |
| (1) + (2) + (3) | 100 | 100 | 98 | 97 |

*Dye concentration (o.w.f.)

Further, with the dye of this invention, a clear and rich yellow color excellent in various fastnesses such as resistance to light, resistance to heat, resistance to color migration etc. can be given to molded articles of synthetic resins such as film, plate, pipe and the like.

The styryl compound of this invention can be produced usually in the following manner. First, a compound represented by the following general formula (II):

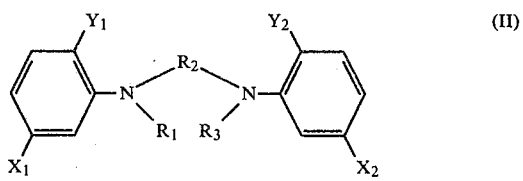

wherein $R_1$, $R_2$, $R_3$, $X_1$, $X_2$, $Y_1$ and $Y_2$ are as defined above, is formylated by Vilsmeier reaction to give dialdehyde (III):

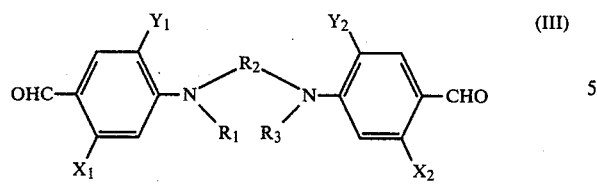

wherein $R_1$, $R_2$, $R_3$, $X_1$, $X_2$, $Y_1$ and $Y_2$ are as defined above. This dialdehyde (III) is reacted with malononitrile in the presence of a basic catalyst such as ammonia, dimethylamine, diethylamine, piperidine, piperidine acetate, sodium alcoholate or potassium alcoholate preferably at an elevated temperature and, if necessary, in a solvent such a methanol, ethanol, benzene, toluene, xylene, chloroform, carbon tetrachloride or the like to give the compound of general formula (I).

As example of the compound of general formula (III), the following can be referred to:

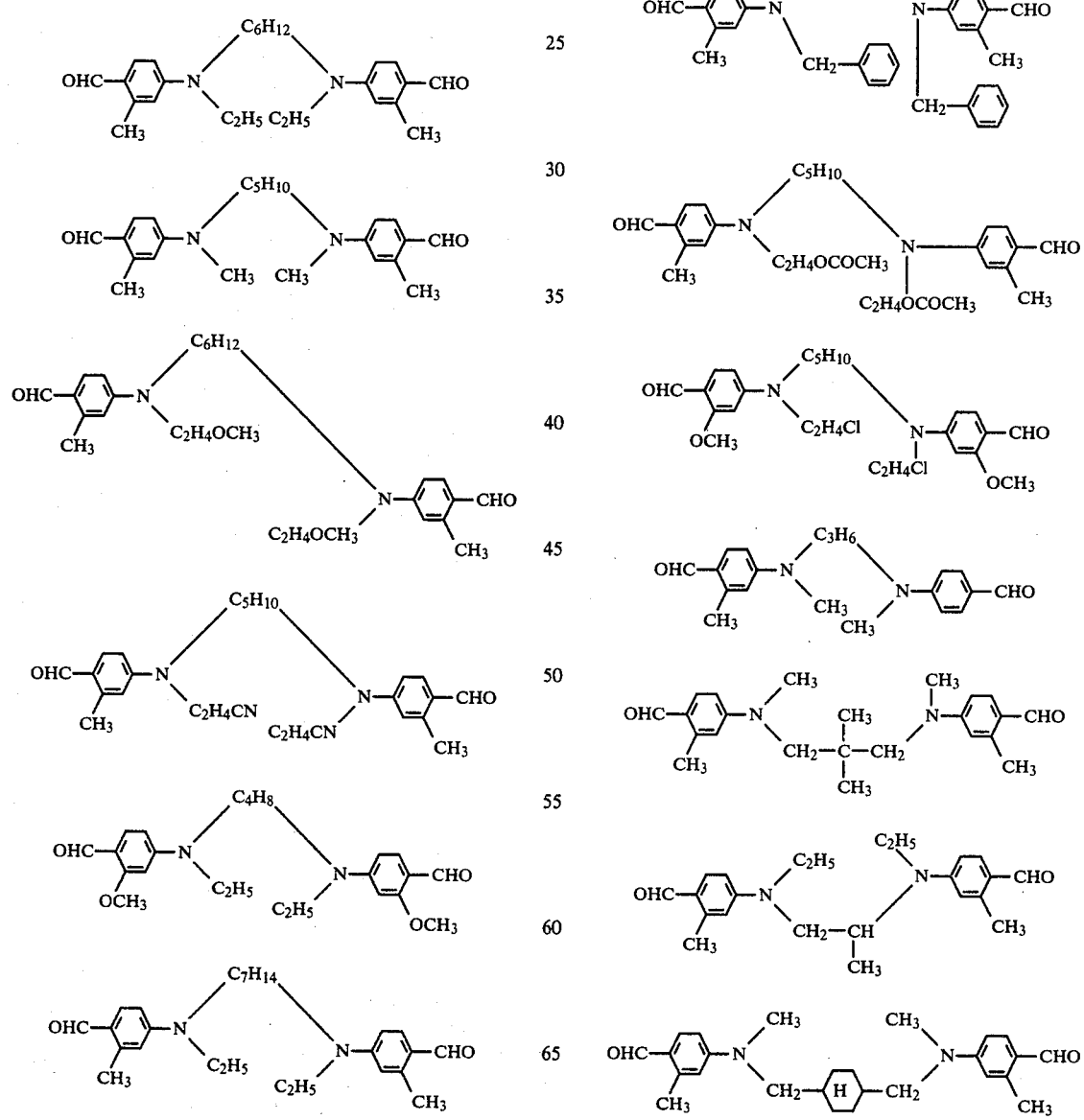

-continued

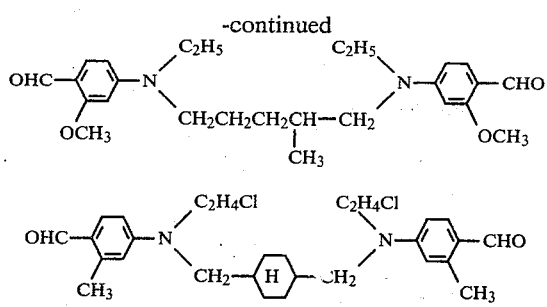

In practicing the dyeing process of this invention, one kind or two or more kinds of the dye represented by general formula (I) (each dyes of general formula (I) can be mixed together by the usual method so that the proportion of individual dyes come to 10–90%) is pulverized into fine particles together with an appropriate dispersing agent in an aqueous medium to give a dispersion. The dispersed dye is used in the form of paste or in a powdery form after being dried by means of spray or the like. A hydrophobic fiber is dipped into an aqueous medium and dyed with the dye composition thus obtained under an elevated pressure at a temperature of 105° C. or higher and preferably 110°–140° C. It is also possible to dye the fiber in the presence of a carrier such as o-phenylphenol, trichlorobenzene or the like at a relatively high temperature, for example at the boiling temperature of water.

It is also possible to carry out the so-called thermosol dyeing which comprises printing a cloth with the dye dispersion and then treating it with dry heat at 150°–230° C. for 30–60 seconds. On the other hand, in the case of printing, the dye dispersion is kneaded together with an appropriate paste and printed onto a cloth, after which it is subjected to steaming or thermosol treatment to effect dyeing. A solvent dyeing process using an organic solvent such as trichloroethylene, perchloroethylene or the like as a dyeing medium is also possible.

The coloration of synthetic resins is carried out, for example, in the following manner. Thus, a necessary quantity of the styryl compound represented by general formula (I) is blended into a synthetic resin and kneaded, after which the mixture is formed into a molded article such as film, plate, pipe, etc. by an arbitrary molding process such as compression molding, injection molding, calendering, extrusion or the like, whereby a fast yellow color can be given to the synthetic resin.

In this invention, a satisfactory result can be obtained also by using, in combination with the compound of general formula (I), one or more kinds of conventional colorants, additives and the like including organic pigments such as copper phthalocyanine blue, metal-free phthalocyanine blue, copper phthalocyanine green, quinacridone red and the like; inorganic pigments such as carbon black, red oxide, titanium oxide, calcium carbonate, barium sulfate and the like; fluorescent whitening agents; lubricants such as metallic soaps and waxes; ultraviolet absorbers; antioxidants; and the like, in an appropriate proportion.

Examples of the synthetic resins usable in this invention include resins belonging to polystyrene family, polyacrylate family, polyolefin family, polyacrylonitrile family, polyvinyl chloride family, polyamide family, polycarbonate family, polyacetal family and the like as well as acrylonitrilestyrene copolymer (AS resin), acrylonitrile-butadienestyrene copolymer (ABS resin) and the like.

This invention will be illustrated in more detail with reference to the following examples which are presented in a non-limitative way.

In the examples, parts are by weight.

EXAMPLE 1

(Production of Dye)

16.6 Parts of N-ethyl-m-toluidine, 10 parts of 1,6-dibromohexane and 6.5 parts of soda ash were reacted at 120° C. for 5 hours. The excessive N-ethyl-m-toluidine was distilled off by steam distillation and then the oily layer was separated. Thus, 13 parts of a compound represented by the following formula:

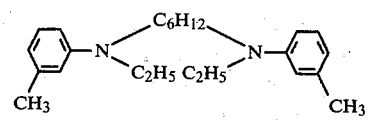

was obtained.

A mixture comprising 10 parts of this compound and 10 parts of dimethylformamide was dropped into a mixture comprising 15 parts of phosphorus oxychloride and 10 parts of dimethylformamide at a temperature of 20° C. or lower and reacted at 85°–90° C. for 6 hours. The reaction mixture was discharged into ice water and neutralized with sodium hydroxide, and the oily layer was separated. Thus, 8 parts of a dialdehyde represented by the following formula:

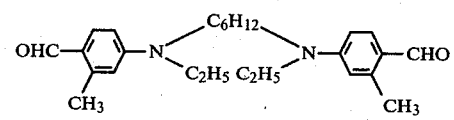

was obtained.

Then, 4.6 parts of the dialdehyde represented by the above-mentioned formula and 1.5 parts of malononitrile were heated under reflux for one hour in a mixture comprising 30 parts of methanol and 0.1 part of piperidine. The reaction mixture was cooled, filtered and washed with water to obtain 4 parts of the dye represented by formula (1) of Table 1:

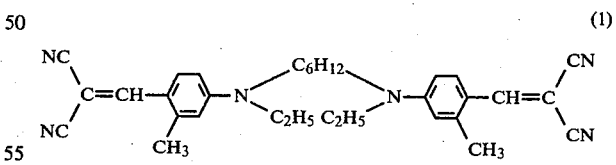
(1)

It was recrystallized from pyridine-ethanol, and there was obtained a yellow colored crystal having a melting point of 186°–188° C.

$\lambda_{max}^{DMF} = 454$ nm (Dyeing)

2 Parts of the dye of formula (1) was mixed with 5 parts of naphthalene-$\beta$-sulfonic acid formaldehyde condensate, 3 parts of sodium ligninsulfonate and 20 parts of water and ground in a ball mill for 20 hours. The resulting dispersion was dried by means of spray to obtain 10 parts of a dyeing composition. Its one part was added to 3,000 parts of water together with 100 parts of polyester spun yarn, and dyeing was carried out under an elevated pressure at 130° C. for 60 minutes. After being dyed, the yarn was washed with hot water and further subjected to reductive washing and then dried to give a clear and fast yellow colored dyed product having a high color value.

EXAMPLE 2

The compound of formula (2) of Table 1:

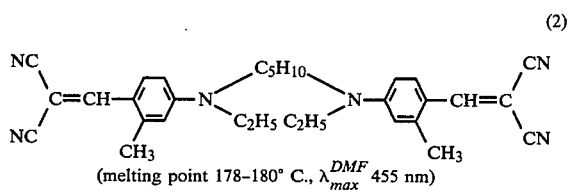

(2)

(melting point 178–180° C., $\lambda_{max}^{DMF}$ 455 nm)

was produced by repeating the reaction of Example 1, exccept that the dialdehyde used in Example 1 was replaced by a dialdehyde represented by the following formula:

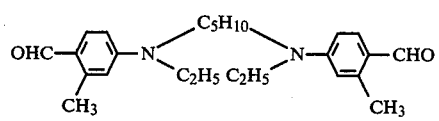

A dyeing bath was prepared from this dye, with which dyeing was carried out in the same manner as in Example 1. Thus, a clear and fast yellow colored dyed product having a high color strength was obtained.

EXAMPLE 3

The compound of formula (3) of Table 1:

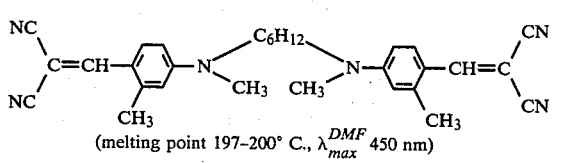

(3)

(melting point 197–200° C., $\lambda_{max}^{DMF}$ 450 nm)

was produced by repeating the procedure of Example 1, except that the dialdehyde used in Example 1 was replaced by a dialdehyde represented by the following formula:

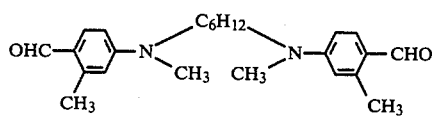

10 parts of the compound represented by formula (3) was dispersed into 3,000 parts of water with an appropriate quantity of dispersing agent, to which was added 3 parts of sodium alginate. A plain cloth of polyester/cotton (65/35) was dipped into the dispersion, squeezed with mangle so that the increase in weight came to 60%, subjected to intermediate drying by means of a hot air oven and then heat-treated in dryness at 200° C. for 90 seconds.

After completion of thermosol coloration, the cloth was subjected to reductive washing and washing with water, and then dried.

The dyed product thus obtained was only rarely stained in the cotton side, exhibited a clear yellow color in the polyester side, and was excellent in various fastnesses.

EXAMPLE 4

The compound of formula (18) of Table 1:

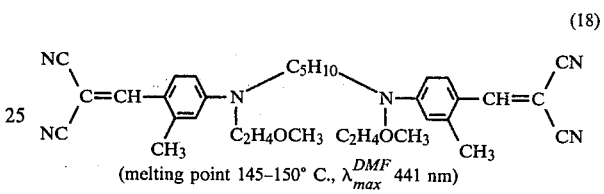

(18)

(melting point 145–150° C., $\lambda_{max}^{DMF}$ 441 nm)

was produced by repeating the procedure of Example 1, except that the dialdehyde used in Example 1 was replaced by a dialdehyde represented by the following formula:

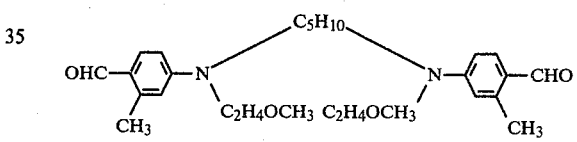

10 parts of dyeing composition was prepared from 2 parts of the compound of formula (18) in the same manner as in Example 1. Its 0.5 part was added to 1,000 parts of water together with 4 parts of o-phenylphenol, 2 parts of acetic acid and 20 parts of polyester spun yarn, and dyeing was carried out at 100° C. for 90 minutes. The dyed product thus obtained was washed with hot water, subjected to reductive washing and dried to obtain a clear yellow colored dyed product excellent in various fastnesses.

EXAMPLES 5–13

A polyester fiber was dyed or printed by repeating the procedure mentioned in Examples 1–4, except that the dyes used in Examples 1–4 were replaced by the dyes shown in Table 4. Thus, there were obtained fast dyed products of which color shades are shown in the right column of the table.

TABLE 4

| Example No. | Structural formula | | | | | | | $\lambda_{max}^{DMF}$ (nm) | Color shade on polyester |
|---|---|---|---|---|---|---|---|---|---|
| | $X_1$ | $X_2$ | $Y_1$ | $Y_2$ | $R_1$ | $R_2$ | $R_3$ | | |
| 5 | $CH_3$ | $CH_3$ | H | H | $C_2H_4CN$ | $C_5H_{10}$ | $C_2H_4CN$ | 442 | Greenish yellow |
| 6 | $OCH_3$ | $OCH_3$ | H | H | $C_2H_5$ | $C_4H_8$ | $C_2H_5$ | 458 | Yellow |
| 7 | $OCH_3$ | $OCH_3$ | $OCH_3$ | $OCH_3$ | $CH_3$ | $C_8H_{16}$ | $CH_3$ | 480 | Reddish yellow |
| 8 | Cl | Cl | H | H | $CH_3$ | $C_5H_{10}$ | $CH_3$ | 444 | Greenish yellow |

TABLE 4-continued

| Example No. | X₁ | X₂ | Y₁ | Y₂ | R₁ | R₂ | R₃ | $\lambda_{max}^{DMF}$ (nm) | Color shade on polyester |
|---|---|---|---|---|---|---|---|---|---|
| 9 | $CH_3$ | $CH_3$ | H | H | $C_2H_4OCOCH_3$ | $C_5H_{10}$ | $C_2H_4OCOCH_3$ | 435 | Greenish yellow |
| 10 | $CH_3$ | $CH_3$ | H | H | $CH_3$ | $C_6H_{12}$ | $C_2H_5$ | 454 | Greenish yellow |
| 11 | $CH_3$ | $CH_3$ | H | H | $CH_3$ | $-CH_2-C(CH_3)_2-CH_2-$ | $CH_3$ | 455 | Greenish yellow |
| 12 | $CH_3$ | $CH_3$ | H | H | $C_2H_5$ | $-CH_2-CH(CH_3)-$ | $C_2H_5$ | 454 | Greenish yellow |
| 13 | $CH_3$ | $CH_3$ | H | H | $CH_3$ | $-CH_2-C_6H_{10}-CH_2-$ | $CH_3$ | 456 | Greenish yellow |

EXAMPLE 14

10 Parts of dyeing composition was prepared by mixing 1 part of the dye of formula (1) and 1 part of the dye of formula (2), both shown in Table 1, with 5 parts of naphthalene-β-sulfonic acid formaldehyde condensate, 3 parts of sodium ligninsulfonate and 20 parts of water, grinding the resulting mixture in a ball mill for 20 hours and spray-drying the resulting dispersion. One part of the dyeing composition thus obtained was added to 3,000 parts of water together with 100 parts of polyester spun yarn, and dyeing was carried out at an elevated pressure at 130° C. for 60 minutes. After being dyed, the yarn was washed with hot water, subjected to reductive washing and dried. Thus, a clear and fast yellow colored dyed product having a high color value was obtained.

As compared with dyed products obtained by similarly dyeing the yarn with 2 parts of dye (1) or dye (2) alone, the dyed product obtained herein had a much greater color strength.

EXAMPLE 15

The dyeing procedure of Example 14 was repeated, except that the dye (2) was replaced by dye (3) of Table 1. The results obtained were the same as in Example 14.

EXAMPLE 16

Dyeing and treatment were carried out in the same manner as in Example 14 with a mixture comprising each 1 part of dyes (1), (2) and (3) shown in Table 1. Thus, a clear and fast yellow colored dyed product was obtained.

As compared with the dyed cloths obtained by similarly dyeding a cloth with 3 parts of dye (1), dye (2) or dye (3) used alone, the dyed cloth herein obtained had a much greater color strength.

EXAMPLE 17

Each 3 parts of the dyes (1), (2) and (3) shown in Table 1 were together dispersed into 3,000 parts of water with an appropriate quantity of dispersing agent, to which was added 3 parts of sodium alginate. A polyester cloth was dipped into this dispersion, squeezed with mangle so that the increase in weight came to 60%, subjected to intermediate drying by means of a hot air oven and then heat-treated in dryness at 200° C. for 90 seconds.

After completion of thermosol coloration, the cloth was subjected to reductive washing and washing with water, and then dried.

The dyed product thus obtained exhibited a clear yellow color and was excellent in various fastnesses.

As compared with dyed cloths obtained by similarly dyeing a cloth with 10 parts of dye (1), dye (2) or dye (3) separately used, the dyed product herein obtained was much superior in color strength.

EXAMPLE 18

The treatment of Example 14 was repeated with a mixture comprising each one part of dyes (4), (5) and (6) of Table 1. Thus, a clear and fast yellow colored dyed product was obtained. To dyed cloths obtained by similary dyeing a cloth with 3 parts of dye (4), dye (5) or dye (6) used alone, the dyed cloth herein obtained was much superior in color strength.

EXAMPLE 19

Each 1 part of dyes (1), (7) and (8) of Table 1 were together mixed with 5 parts of naphthalene-β-sulfonic acid formaldehyde condensate, 2 parts of sodium ligninsulfonate and 20 parts of water and ground in a ball mill for 20 hours. The resulting dispersion was diluted with water to adjust its dye content to 20%. From this paste, a printing paste of the following formulation was prepared:

| | |
|---|---|
| Dye paste | 50 |
| Lukewarm water | 340 |
| Sodium m-nitrobenzenesulfonate | 10 |
| Locust bean gum (gum content 15%) | 600 |
| Total | 1,000 |

This printing paste was printed onto a polyester cloth, dried and then steamed at 130° C. for 30 minutes. After washing and drying, there was obtained a clear yellow colored printed cloth having an excellent feeling of richness.

To printed cloths obtained by printing a cloth similarly with 3 parts of dye (1), dye (7) or dye (8) used alone, the printed cloth herein obtained was much superior in color strength.

EXAMPLE 20

Pellets were produced by heating and blending 0.2 part of the finely powdered compound represented by formula (1) of Table 1:

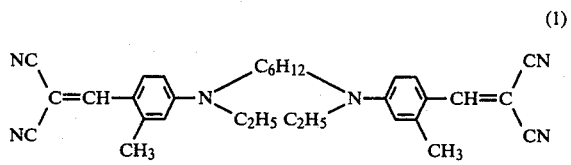

(1)

and 100 parts of powdery ABS resin at 120° C. followed by passing the mixture through an extruder. The pellets were molded at 230° C. by means of an injection molding machine. Thus, there was obtained a clear yellow colored molded article excellent in fastness to light, heat and migration.

In another experiment, pellets were produced and molded by repeating the above-mentioned procedure except that the 0.2 part of compound (1) (colorant) was used in combination with 0.5 part of titanium oxide. Thus, a fast and light yellow colored molded article was obtained.

EXAMPLE 21

Pellets were prepared by blending 0.05 part of the finely powdered compound represented by formula (2) of Table 1:

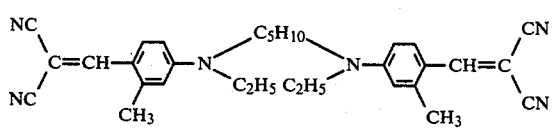

(2)

and 100 parts of powdery polystyrene resin by means of a V type tumbler followed by passing the blended mixture through an extruder. Then the pellets were molded at 220° C. by means of an injection molding machine. Thus, a clear yellow colored molded article excellent in fastness to light, heat and migration was obtained.

In another experiment, pellets were produced and molded by repeating the above-mentioned procedure except that the 0.05 part of colorant compound (2) was used in combination with 0.5 part of titanium oxide. Thus, a light yellow colored product was obtained.

EXAMPLE 22

100 Parts of a vinyl chloride compound comprising 100 parts of polyvinyl chloride, 2 parts of dioctyl phthalate, 3 parts of dibutyltin maleate and 1 part of dibutyltin dilaurate was mixed with 0.2 part of the compound represented by the following formula,

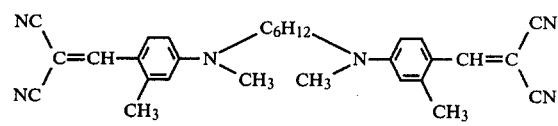

and then rolled at 140° C. for 7 minutes by means of a twin roll calender. Then, a clear yellow colored film excellent in fastness to sunlight, heat and migration was obtained.

EXAMPLE 23-32

The procedure of Examples 20-22 was repeated, except that the compounds of formula (1), (2) and of Example 22 were replaced by the compounds shown in the following Table 5. Thus, colored molded articles excellent in fastness to light, heat and migration were obtained.

TABLE 5

| Example No. | $X_1$ | $X_2$ | $Y_1$ | $Y_2$ | $R_1$ | $R_2$ | $R_3$ | Color of synthetic resin |
|---|---|---|---|---|---|---|---|---|
| 23 | $CH_3$ | $CH_3$ | H | H | $C_2H_4OCH_3$ | $C_3H_{10}$ | $C_2H_4OCH_3$ | Yellow |
| 24 | $CH_3$ | $CH_3$ | H | H | $C_2H_4CN$ | $C_5H_{10}$ | $C_2H_4CN$ | " |
| 25 | $OCH_3$ | $OCH_3$ | H | H | $C_2H_5$ | $C_4H_8$ | $C_2H_5$ | " |
| 26 | $OCH_3$ | $OCH_3$ | $OCH_3$ | $OCH_3$ | $CH_3$ | $C_8H_{16}$ | $CH_3$ | Reddish yellow |
| 27 | Cl | Cl | H | H | $CH_3$ | $C_5H_{10}$ | $CH_3$ | Yellow |
| 28 | $CH_3$ | $CH_3$ | H | H | $C_2H_4OCOCH_3$ | " | | " |
| 29 | H | H | H | H | $CH_3$ | $C_6H_{12}$ | $C_2H_5$ | " |
| 30 | $CH_3$ | $CH_3$ | H | H | $CH_3$ | $-CH_2-\underset{\underset{CH_3}{\vert}}{\overset{\overset{CH_3}{\vert}}{C}}-CH_2-$ | $CH_3$ | " |
| 31 | Cl | Cl | H | H | $C_2H_5$ | $-CH_2-\underset{CH_2CH_3}{\underset{\vert}{CH}}-$ | $C_2H_5$ | " |
| 32 | $CH_3$ | $CH_3$ | H | H | $CH_3$ | $-CH_2-\langle H \rangle-CH_2-$ | $CH_3$ | " |

What is claimed is:

1. A styryl compound represented by the formula (I):

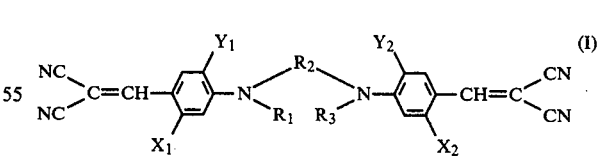

(I)

wherein $X_1$ is a halogen atom or a lower alkyl or lower alkoxy group, $X_2$, $Y_1$ and $Y_2$ are each a hydrogen or halogen atom or a lower alkyl or lower alkoxy group, $R_1$ and $R_3$ are each an unsubstituted or substituted alkyl group, and $R_2$ is a straight or branched $C_3$-$C_{10}$ alkylene group or an alicyclic hydrocarbon-containing alkylene group.

2. The compound according to claim 1, wherein $Y_1$ and $Y_2$ are each hydrogen, $X_1$, $X_2$, $R_1$ and $R_3$ are each lower alkyl group, and $R_2$ is a $C_5$-$C_7$ alkylene group.

3. A compound of the formula,

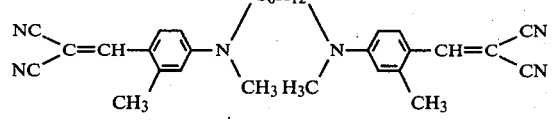

4. A compound of the formula,

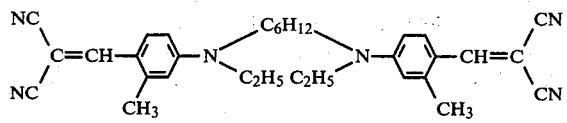

5. A compound of the formula,

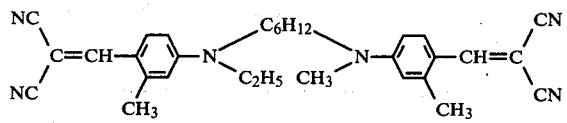

6. A dye composition comprising at least two kinds of a styryl compound of the formula (I),

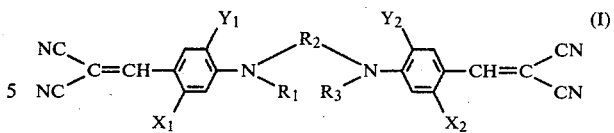

wherein $X_1$ is a halogen atom or a lower alkyl or lower alkoxy group, $X_2$, $Y_1$ and $Y_2$ are each a hydrogen or halogen atom or a lower alkyl or lower alkoxy group, $R_1$ and $R_3$ are each an unsubstituted or substituted alkyl group, and $R_2$ is a straight or branched $C_3$-$C_{10}$ alkylene group or an alicyclic hydrocarbon-containing alkylene group.

7. A process for coloring synthetic resins which comprises adding and mixing, into a synthetic resin, a styryl compound represented by the formula (I):

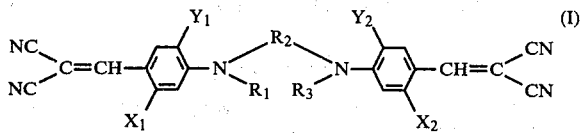

wherein $X_1$ is a halogen atom or a lower alkyl or lower alkoxy group, $X_2$, $Y_1$ and $Y_2$ are each a hydrogen or halogen atom or a lower alkyl or lower alkoxy group, $R_1$ and $R_3$ are each an unsubstituted or substituted alkyl group, and $R_2$ is a straight or branched $C_3$-$C_{10}$ alkylene group or an alicyclic hydrocarbon-containing alkylene group.

* * * * *